US010356726B2

(12) United States Patent
Ma et al.

(10) Patent No.: US 10,356,726 B2
(45) Date of Patent: Jul. 16, 2019

(54) UPLINK ACCESS WITH COMPRESSED MODE IN A COMMUNICATION NETWORK SYSTEM

(71) Applicant: Nokia Solutions and Networks Oy, Espoo (FI)

(72) Inventors: Dengji Ma, Hangzhou (CN); Bi Hui Ke, Hangzhou (CN)

(73) Assignee: Nokia Solutions and Networks Oy, Espoo (FI)

( * ) Notice: Subject to any disclaimer, the term of this patent is extended or adjusted under 35 U.S.C. 154(b) by 63 days.

(21) Appl. No.: 15/127,893

(22) PCT Filed: Mar. 31, 2014

(86) PCT No.: PCT/CN2014/074384
§ 371 (c)(1),
(2) Date: Sep. 21, 2016

(87) PCT Pub. No.: WO2015/149224
PCT Pub. Date: Oct. 8, 2015

(65) Prior Publication Data
US 2017/0105180 A1    Apr. 13, 2017

(51) Int. Cl.
*H04W 52/52* (2009.01)
*H04W 52/28* (2009.01)
(Continued)

(52) U.S. Cl.
CPC ....... *H04W 52/225* (2013.01); *H04W 52/228* (2013.01); *H04W 52/243* (2013.01);
(Continued)

(58) Field of Classification Search
None
See application file for complete search history.

(56) References Cited

U.S. PATENT DOCUMENTS

2001/0024451 A1*   9/2001   Le Strat ............... H04L 1/0009
370/468
2008/0240013 A1   10/2008   Johnson et al.
(Continued)

FOREIGN PATENT DOCUMENTS

CN   1399426 A   2/2003
CN   1969483 A   5/2007
(Continued)

*Primary Examiner* — Angel T Brockman
(74) *Attorney, Agent, or Firm* — Harrington & Smith

(57) ABSTRACT

An access device of a communication network system calculates power estimation values for successive time slots of a communication channel based on measurement values for the successive time slots from a user equipment accessing the communication network system via the access device. The access device performs transmit power control based on the power estimation values. If a compressed mode is active for the user equipment, from use for the transmit power control, power estimation values or measurement values for predetermined time slots are excluded, which include no time slot or at least one time slot before a first time point T1 at which the user equipment has entered the compressed mode, at least one time slot after a second time point T2 at which the user equipment has returned from the compressed mode, and each time slot between the first time point T1 and the second time point T2.

20 Claims, 8 Drawing Sheets

(51) Int. Cl.
  *H04W 72/04* (2009.01)
  *H04W 52/22* (2009.01)
  *H04W 52/24* (2009.01)
  *H04W 52/44* (2009.01)
  *H04W 52/14* (2009.01)

(52) U.S. Cl.
  CPC ......... *H04W 52/282* (2013.01); *H04W 52/44* (2013.01); *H04W 72/0446* (2013.01); *H04W 52/143* (2013.01); *H04W 52/241* (2013.01); *H04W 52/245* (2013.01); *H04W 52/52* (2013.01)

(56) References Cited

U.S. PATENT DOCUMENTS

2012/0082192 A1    4/2012  Pelletier et al.
2015/0271816 A1*   9/2015  Akkarakaran .... H04W 72/0446
                                             370/336

FOREIGN PATENT DOCUMENTS

| CN | 101079664 A | 11/2007 |
| EP | 1672814 A1 | 6/2006 |
| EP | 1895633 A1 | 10/2007 |
| WO | WO 2006/003809 A1 | 1/2006 |

\* cited by examiner

UPLINK ACCESS WITH COMPRESSED MODE IN A COMMUNICATION NETWORK SYSTEM

BACKGROUND OF THE INVENTION

Field of the Invention

The present invention relates to an apparatus, method and computer program product for providing a uplink access with compressed mode in a communication network system.

Related Background Art

The following meanings for the abbreviations used in this specification apply:
3GPP third generation partnership project
AGC automatic gain control
ASIC application specific integrated circuit
BTS base transceiver station
CM compressed mode
DCH dedicated channel
DPCCH dedicated physical control channel
DTX discontinuous transmission
E-DCH enhanced DCH
FDD frequency division duplex
GSM global system for mobile communications
HSDPA high speed downlink packet access
HSUPA high speed uplink packet access
L layer
LTE long term evolution
PC power control
CLPC closed loop power control
TPC Transmit Power Control
RF radio frequency
RNC radio network controller
RTWP received total wideband power
SIR signal-to-interference ratio
TFCI transport format combination indicator
TGPL transmission gap pattern length
TGSN transmission gap start slot number
TGL transmission gap length
UE user equipment
UL uplink
WCDMA wideband code division multiple access In 3GPP WCDMA FDD standard, a UE monitors cells in other frequencies and other modes in order to enable handover capability between different radio access technologies, e.g. WCDMA, LTE and GSM. To perform such measurements, the UE is commanded to enter a compressed mode (CM). Currently, the CM mechanism is supported on DCH, HSDPA.

SUMMARY OF THE INVENTION

Some embodiments of the invention aim at improving, for example, throughput for a high speed uplink access with introduced CM mechanism.

This is at least in part achieved by the method, apparatus and computer program product as defined in the appended claims.

According to an embodiment, the invention is applied in a Rake component of a BTS of a communication network system, and is used in a situation in which CM is introduced into HSUPA and HSUPA is in a high speed mode with a schedule set equal to or greater than 2SF2+2SF4.

According to an embodiment of the invention, power control performed by an access device of a communication system for a user (e.g. high speed user) with introduced CM mechanism can be performed appropriately and a smooth scheduling can be provided for the user, resulting in an improved throughput, for example.

In the following the invention will be described by way of embodiments thereof with reference to the accompanying drawings.

DESCRIPTION OF THE EMBODIMENTS

With introduction of the CM mechanism in HSUPA, handover of a UE in HSUPA/HSDPA mode becomes faster than in a scenario in which it is necessary to switch the UE first in a UL-DCH mode before entering into the compressed mode (CM).

However, with the introduction of CM in HSUPA, a 2 ms single HSUPA UE with CM active in high speed mode experiences obvious RTWP vibration. This problem will be described in more detail below.

In specific configurations of CM such as TGPL=4, TGSN=10, TGL=10 (double frames), RTWP vibrates significantly and HSUPA L2 scheduling is disturbed, which impacts the throughput. In other words, a reason for low throughput is the RTWP vibration.

Figure 1:
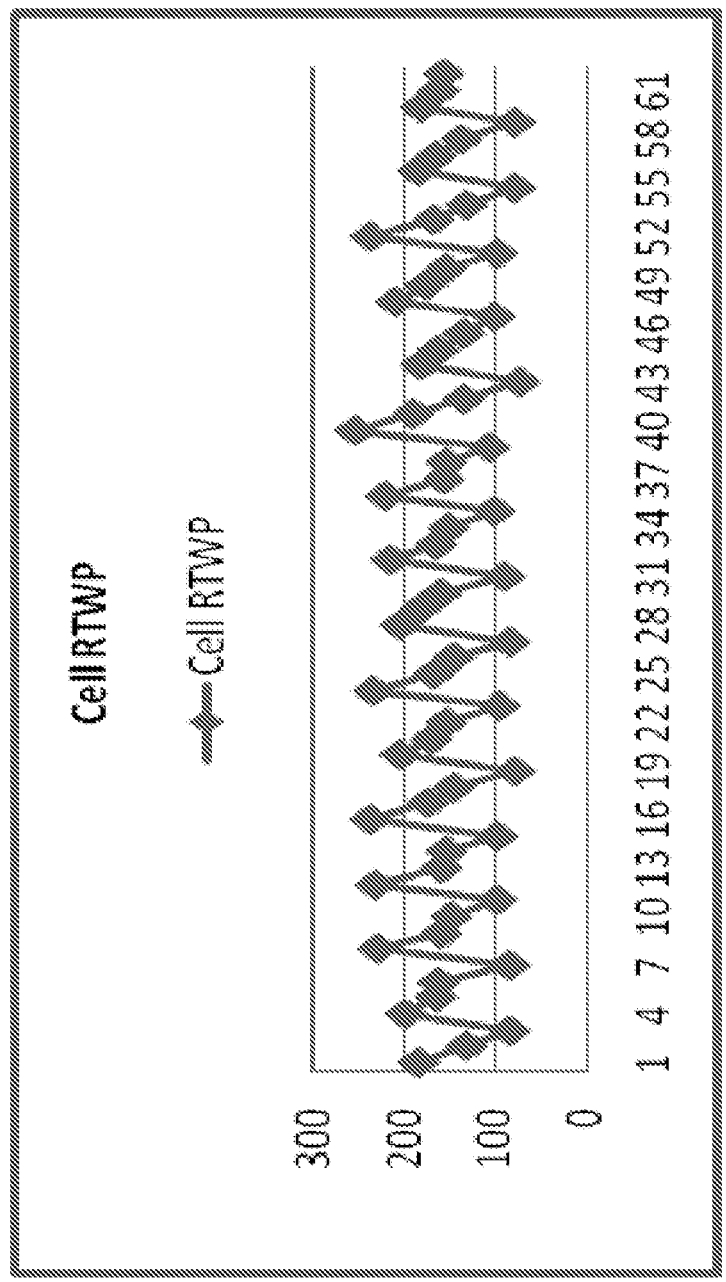
FIG. 1 shows an example of a diagram illustrating an RTWP vibration of a cell of a communication network.

FIG. 1 shows a diagram illustrating an example of cell RTWP samples over frames of a communication channel. The scale of the ordinate is dBm, where the RTWP values have been transferred by a function ((y−1120)/10) dBm.

As illustrated in FIG. 1, the cell RTWP vibrates significantly and regularly in non-CM frames, the lowest sample value shown in FIG. 1 corresponding to a CM frame. Thus, L2 scheduling is disturbed and not stable, resulting in a low throughput.

Figure 2:
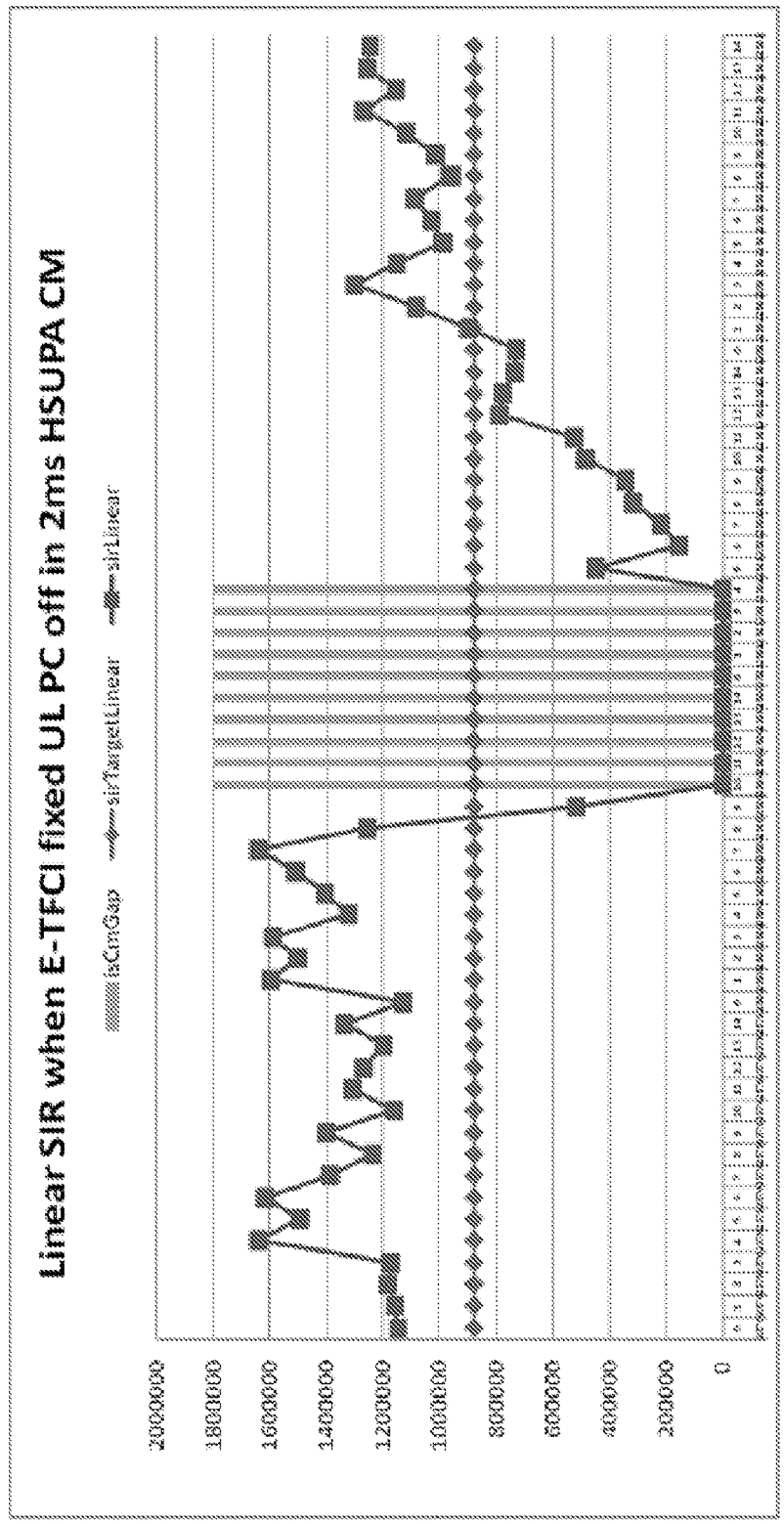
FIG. 2 shows a diagram illustrating an example of a graph of SIR values over slots of a communication channel.

A reason for the RTWP vibration is a low SIR over several time slots after a CM gap, as illustrated in FIG. 2. The value of the ordinate can be transferred to dB by the function: $SIRdB=82+100*\log(SIR/2^{14})$.

When eliminating impacts of other factors such as varying enhanced transport format combination indicator (E-TFCI) and UL power control, the low SIR value is obvious in several slots after exiting the CM gap. Thus, a close loop power control in a BTS observes a low SIR value and raises a UL Tx power of the UE in several following slots. But after these slots, the SIR value becomes quite high, and the BTS drops the UL Tx power of the UE again. Consequently, the RTWP vibration appears.

Figure 3:
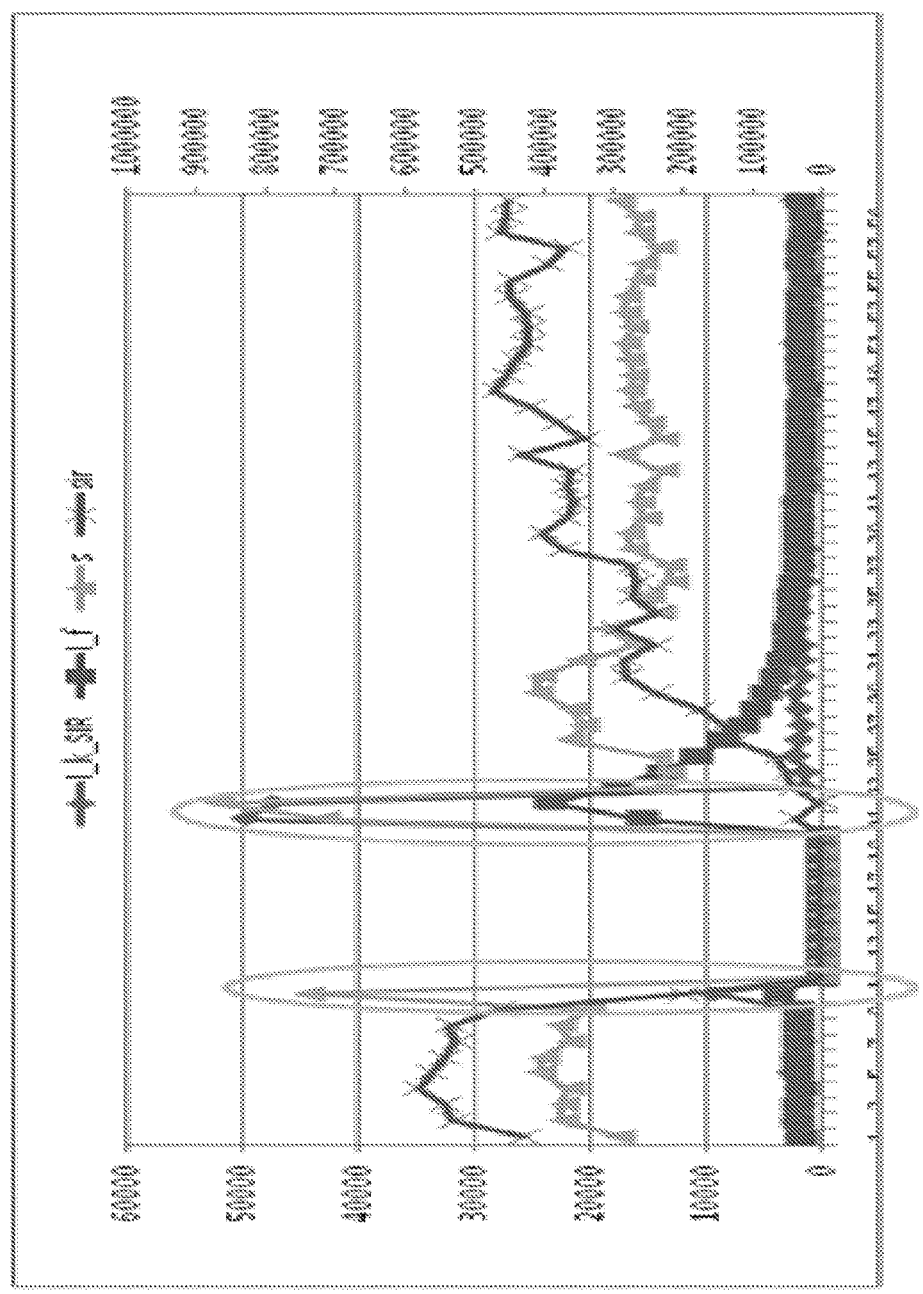
FIG. 3 shows a diagram illustrating an example of graphs of SIR values, interference power values, filtered interference power values and signal power values over slots of a communication channel.

A reason for the low SIR values after the CM gap are abnormal interference (I_k_SIR) and signal (S) values, as illustrated in FIG. 3.

FIG. 3 shows a diagram illustrating examples of graphs of SIR values, interference (I_k_SIR) power values, filtered interference (I_f) power values and signal (S) power values over slots of a communication channel, wherein SIR=S/I_f.

A reason for the low SIR values are abnormal interference and signal power values, but the SIR value is calculated by I_f which is a second order filter value of the interference power value I_k_SIR.

Due to the filter, I_f recovery to normal is slow with initial quite high values after the CM gap. However, S values recover quickly without filter. Thus, the SIR values are kept quite low after several slots after the CM gap. When the impact disappears from initial high filtered interference power values after several slots, the SIR will express the real ratio of S and I. However, this moment the signal power S of the UE is raised quite high, and the SIR values become quite high, and the BTS has to drop the UE power immediately. When the CM gap is regular, the raising and dropping command also is regular and frequently.

A reason for the abnormal I&S values is RF scaling latency.

An RF AGC flow has a "windowing and scaling" mechanism for antenna data. Here, windowing means signal data normalization and the scaling means scaling the signal data to a proper value by means of a varying scaling factor. However, a problem is generated by the scaling factor.

The calculation of the scaling factor is based on an average power of minor period. When the CM gap is exited and signals transmitted on E-DCH are magnified to +20 dB compared to DTX, in that time, the scaling factor still stays on a DTX power level and, thus, the signals are saturated and distorted.

Figure 4:
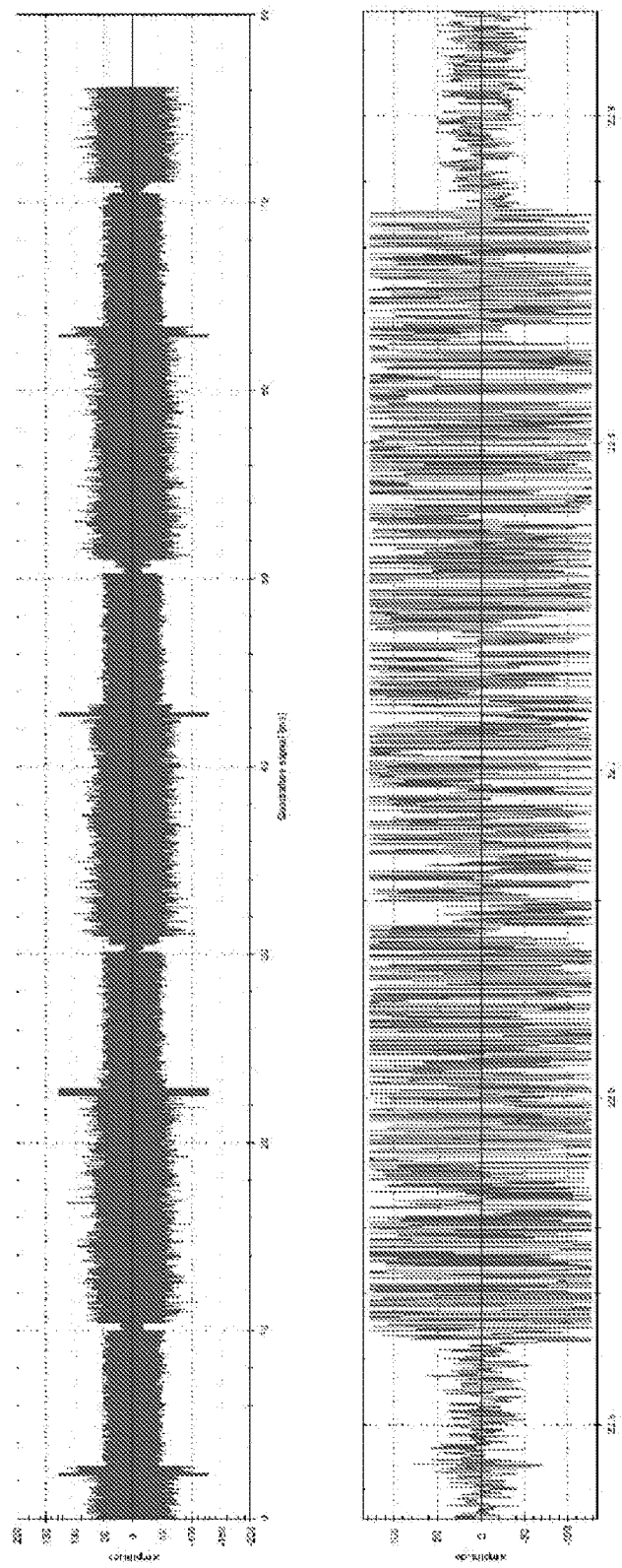
FIG. 4 shows diagrams illustrating examples of RF scaling simulation results.

FIG. 4 shows diagrams illustrating an example of RF scaling simulation results. The scale of the ordinate is an I/Q signal amplitude, the range of which is [−128~127]. The lower diagram is a zoom illustration of an excerpt of the upper diagram.

From the RF simulation results shown in FIG. 4 a phenomenon can be seen that the signals of the UE are enlarged regularly because of the CM gap and sometimes is saturated because of the scaling after the CM gap. The saturated signals last about 0.245 ms as shown in FIG. 4, and affect about ⅓ slot.

In the following, some embodiments of the invention will be described, which aim at solving the above problem without changing the RF AGC flow.

For decreasing the above described RTWP vibration impact, it could be envisaged to use limited E-TFCI. This, however, would affect the throughput. Further, a longer TGPL could be adopted which to a certain degree could decrease the RTWP vibration frequency and provide better scheduling on L2 and better throughput. However, the user may have a bad experience.

According to a first embodiment of the invention, a method of removing abnormal SIR is provided. According to a second embodiment, a method of modifying a CM slot mask is provided, which may achieve even better results as the method according to the first embodiment. Both methods may achieve smooth CLPC and stable UE transmission power, and finally stable cell RTWP can be achieved.

Figure 5:
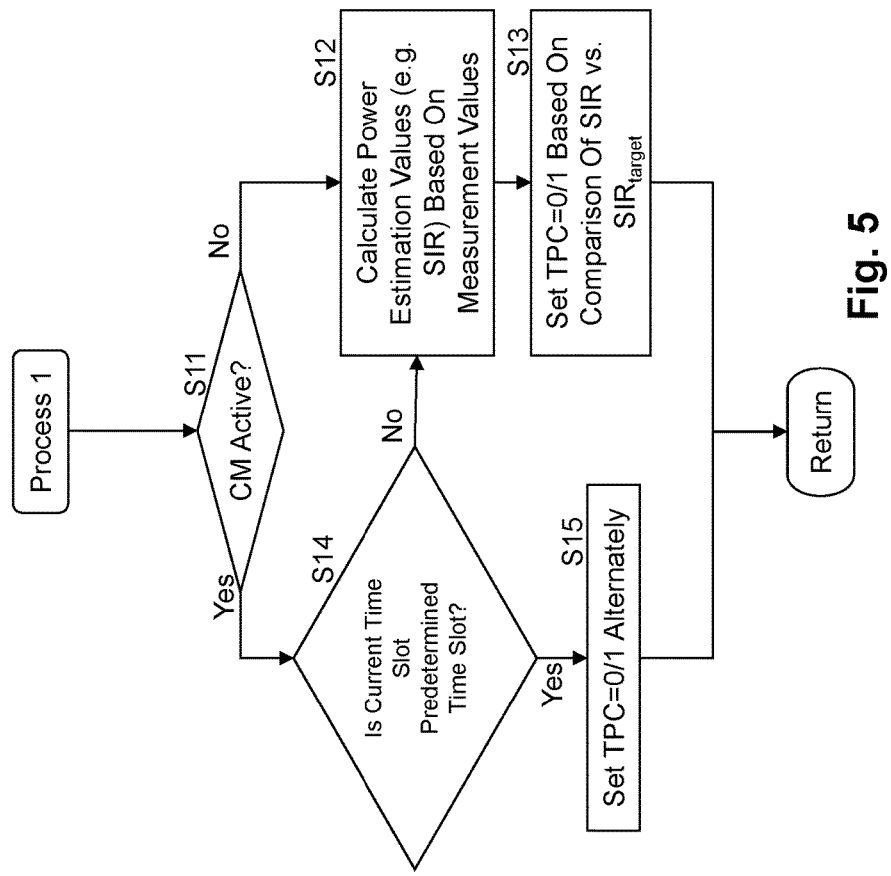
FIG. 5 shows a flowchart illustrating an example of a process of performing received power estimation according to an embodiment of the invention.

FIG. 5 shows a flowchart illustrating an example of a process 1 according to the first and second embodiments. According to an implementation example of the invention, the process is carried out by an access device of a communication network system, such as a base station and an access node, e.g. BTS, NodeB.

In step S11, it is detected if a compressed mode (CM) is active for a UE which accesses the communication network system via the access device and transmits measurement values (e.g. signal power values, interference power values) for successive time slots of a communication channel.

In case it is detected in step S11 that the compressed mode is not active, the process 1 advances to step S12 in which power estimation values (e.g. SIR values, filtered interference power values) for successive time slots are calculated based on the measurement values received from the UE. In step S13, transmit power control (TPC) is performed by setting a TPC value to 0 or 1 according to a comparison between an estimated and calculated signal-to-interference ratio (SIR) value and a target SIR value set e.g. by an RNC of the communication network system, e.g. $SIR_{calculated}$ vs. $SIR_{target}$. After performing step S13, process 1 returns. TPC values set in step S13 can be sent to the UE for completion of a CLPC process.

In case it is detected in step S11 that the compressed mode is active, process 1 advances to step S14 where it is checked whether a current time slot (i.e. a time slot currently processed by process 1) is a predetermined time slot for which measurement values or power estimation values are to be excluded for use in the transmit power control.

According to the first embodiment of the invention, the predetermined time slots comprise no time slot before a first time point T1 at which the UE has entered the compressed mode, at least one time slot after a second time point T2 at which the user equipment has returned from the compressed mode, and each time slot between the first time point T1 and the second time point T2.

According to the second embodiment of the invention, the predetermined time slots comprise at least one time slot before the first time point T1 at which the UE has entered the compressed mode, at least one time slot after the second time point T2 at which the user equipment has returned from the compressed mode, and each time slot between the first time point T1 and the second time point T2. According to an implementation example of the second embodiment, the predetermined time slots comprise at least one and at most two time slots before the first time point T1.

In case it is detected in step S14 that the current time slot is the predetermined time slot, process 1 advances to step S15 in which the transmit power control is performed by setting the TPC value alternately to 0 and 1. After performing step S15, process 1 returns. TPC values set in step S15 can be sent to the UE for completion of the CLPC process.

In case it is detected in step S14 that the current time slot is not the predetermined time slot, process 1 advances to step S12 in which power estimation values (e.g. SIR values, filtered interference power values) for successive time slots are calculated based on the measurement values received from the UE. In step S13, transmit power control (TPC) is performed by setting a TPC value to 0 or 1 according to a comparison between an estimated and calculated signal-to-interference ratio (SIR) value and a target SIR value, e.g. $SIR_{calculated}$ vs. $SIR_{target}$.

According to process 1, when CM is active and the current time slot is the predetermined time slot, TPC is set to 0/1. Otherwise, if CM is active but the current time slot is not the predetermined time slot or CM is de-active, SIR is calculated based on the received measurement values from the UE and TPC is set according to a comparison result of calculated SIR vs. SIR target.

Figure 6:
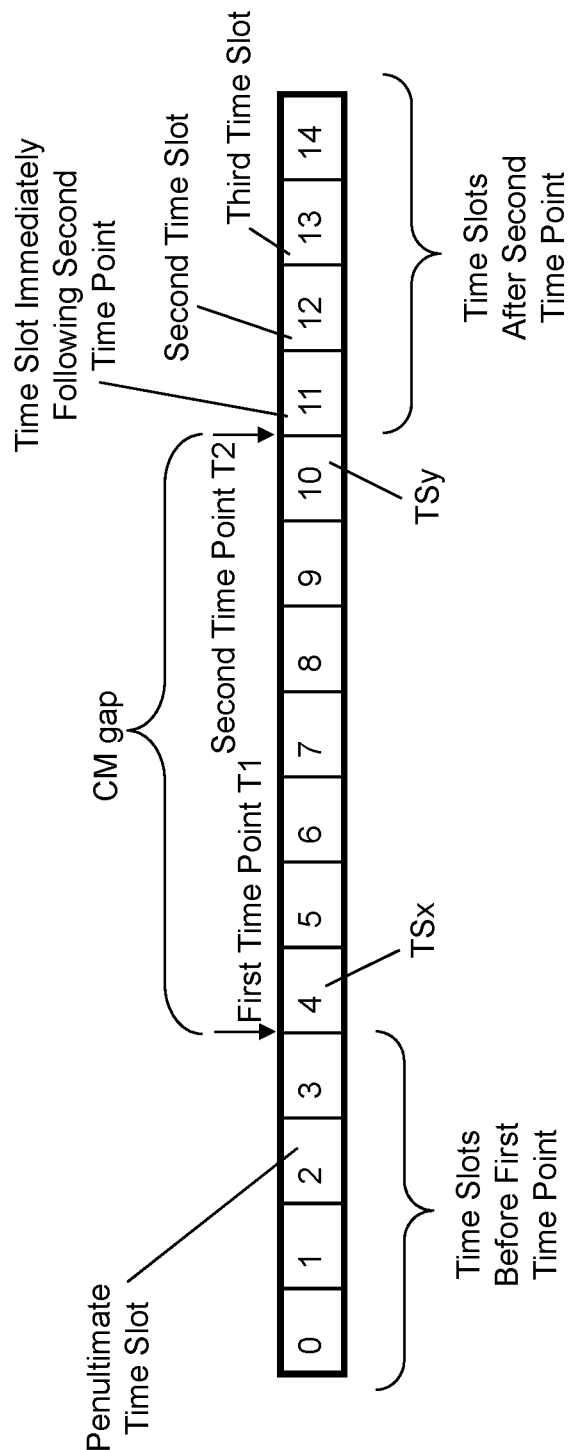
FIG. 6 shows a diagram illustrating an example of an arrangement of time slots according to an embodiment of the invention.

Referring to FIG. 6, an arrangement of time slots of a communication channel between the UE and the access device is shown. FIG. 6 shows the first time point T1 at which the UE enters the compressed mode, and the second time point T2 at which the UE returns from the compressed mode. FIG. 6 also shows the time slots before and after the compressed mode.

After the exclusion, the process advances to step S13 in which received power estimation is performed.

In the following, the first embodiment will be described.

Considering the disturbed interference and signal power values before and after the CM gap, by skipping them directly from UL power control point of view, a filter filtering the interference power values will not be affected by very high values, and the PC of the access device will not raise power of the UE based on a wrong SIR.

According to an implementation example of the first embodiment, there are three trigger conditions for triggering the skipping of the disturbed interference and signal power values:

$$E\text{-}DCH\ set >= 2*SF4$$

$$I\_k\_SIR_{1st\_slot\_after\_gap}/I\_f_{2nd\_slot\_before\_gap} > m$$

$$S_{1st\_slot\_after\_gap}/S_{2nd\_slot\_before\_gap} > n$$

m and n are integer values. For example, m and n comprise values of 2, 3 and 4. According to an example embodiment, the first trigger condition which relates to whether the user equipment is in a high speed mode of HSUPA or not is optional.

Referring to FIG. 6, the first slot after gap is the first time slot immediately following the second time point T2, and the second slot before gap is the penultimate time slot.

When the three conditions are triggered, the access device operates power control (PC) as indicated below:

For TPC value sent to UE, 0 is set for $1^{st}$ time slot and 1 is set for $2^{nd}$ time slot after the CM gap.

I_f value is set equal to the I_k_SIR value for the $3^{rd}$ time slot to eliminate the filter impact.

According to the first embodiment, the interference and signal power values for the penultimate time slot before T1 are stored and compared with the interference and signal power values for 1~2 time slots after T2. If the predetermined thresholds are triggered, TPC is set to 0/1.

Figure 7:
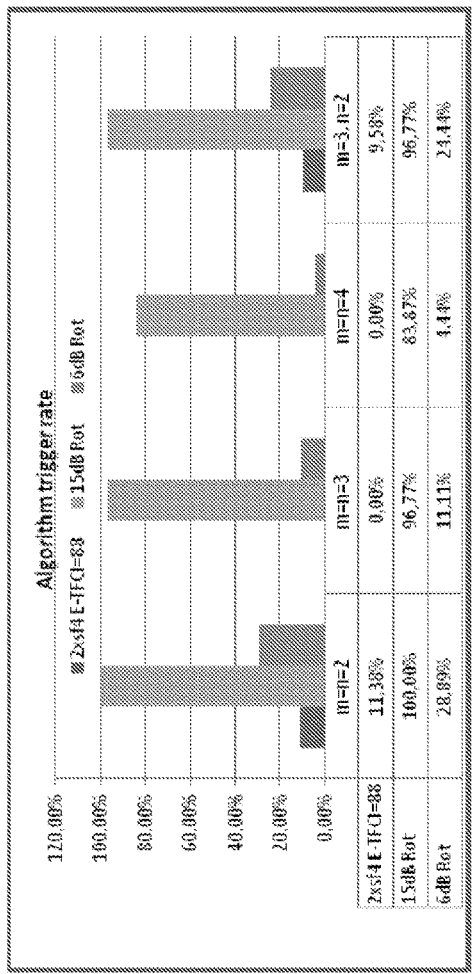
FIG. 7 shows a diagram illustrating an example of an algorithm triggering rate in cases of different parameters according to a first embodiment of the invention.
Figure 8:
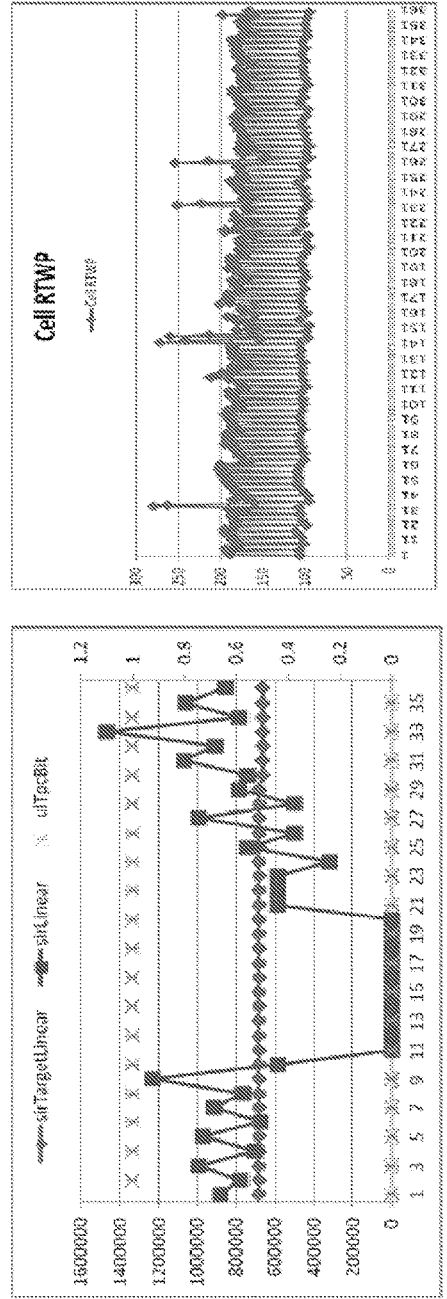
FIG. 8 shows diagrams illustrating examples of a test result of removing an abnormal SIR according to the first embodiment of the invention.

FIG. 7 illustrates the trigger rate for different parameters, and FIG. 8 shows test results for the method according to the first embodiment. In FIG. 8, left hand diagram, the right hand ordinate is a TPC value of [0,1]. In the right hand diagram, the scale of the ordinate is dBm, where the RTWP values have been transferred by a function ((y−1120)/10) dBm.

From FIG. 7 it can be seen that for m=n=2 the trigger rate of the method of the first embodiment is higher than for others settings. According to FIG. 8, left hand diagram, SIR estimation shows a quite good improvement but there still may occur RTWP spikes as depicted in FIG. 8, right hand diagram, which cause some performance loss.

In one example, according to the first embodiment of the invention, a throughput of 3.28 Mbps can be achieved compared to a throughput of 2.8 Mbps without adopting the method of the first embodiment.

However, the trigger conditions may be difficult to set and may be not stable in a customer's environment, so sometimes the PC as described above may not be triggered.

This problem can be overcome by the method according to the second embodiment. In the second embodiment of the invention, time slots affected by the disturbed interference and signal power values are treated as CM gap. An uplink DPCCH CM slot mask (CM mask) is modified for this purpose. An E-DPCH CM slot mask is calculated based on the original DPCCH CM slot mask and not affected and, thus, HSUPA data carried on E-DPCH is not affected.

Use of the modified uplink DPCCH CM slot mask (modified CM mask) is triggered in case E-DCH set>=2*SF2+ 2*SF4, i.e. whether the UE is in the high speed mode or not.

Figure 9:
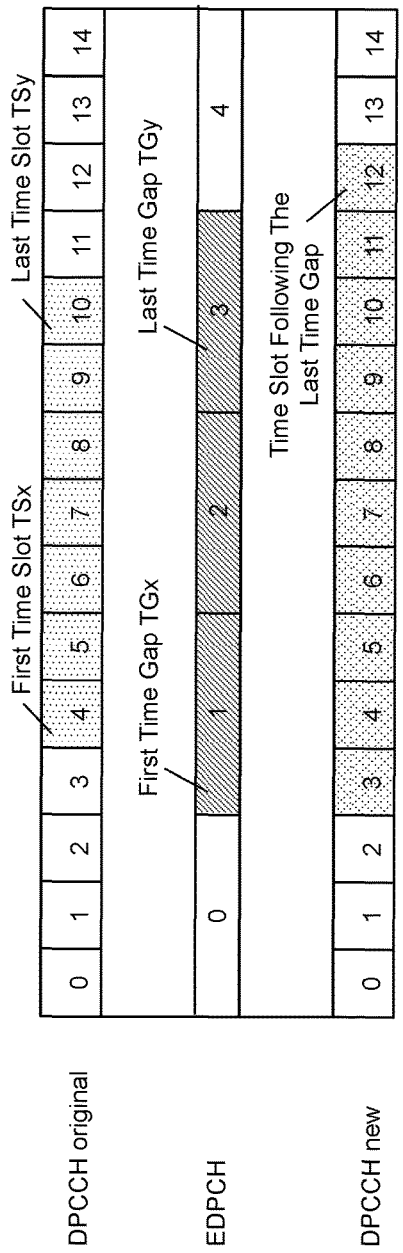
FIG. 9 shows a diagram illustrating an example of an arrangement of time slots and time gaps according to a second embodiment of the invention.

Modification of the uplink DPCCH CM slot mask is described with respect to FIG. 9. FIG. 9 illustrates time slots of channel DPCCH and time gaps of channel E-DPCH. Time slots/gaps highlighted dark indicate a CM mask.

In the compressed mode, the UE does not transmit on the DPCCH during a time period from the first time point T1 to the second time point T2 (shown in FIG. 6), wherein the first time point T1 corresponds to a time slot TSx of the DPCCH and the second time point T2 corresponds to a time slot TSy of the DPCCH.

The modified CM mask for masking out measurement values from the UE on the DPCCH has a length equivalent to a third time period from a time gap TGx of the E-DPCH, the time gap TGx comprising the time slot TSx, to a time gap TGy of the E-DPCH, the time gap TGy comprising the time slot TSy, plus one time slot of the DPCCH following the time gap TGy.

In other words:

modified DPCCH CM slot mask=EDPCH CM slot gaps+1 slot gap after EDPCH CM slot gaps.

Actually the DPCCH CM slot mask is configurable and changeable. And it is also variable for the time slots which are affected on the DPCCH due to the AGC. The above method of calculating the modified DPCCH CM slot mask by considering E-DPCH CM mask and the nature of DPCCH affected by AGC when E-DCH is introduced is an effective way of filtering out instable sample, as will be described in more detail in the following.

In time slots before the DPCCH CM slot mask, due to the RF scaling, the interference and signal power values of the DPCCH are minimized and distorted with the sudden disappearing of E-DPCH signals. Further, in time slots after the DPCCH CM slot mask, due to the RF scaling, the interference and signal power values of the DPCCH rise high up to the slot which maps to the first slot after the E-DPCH gap. This is the reason to add 1 slot length after the E-DPCH CM slot gap, and finally the whole enlarged slot gap is mapped to the modified DPCCH CM slot mask.

Figure 10:
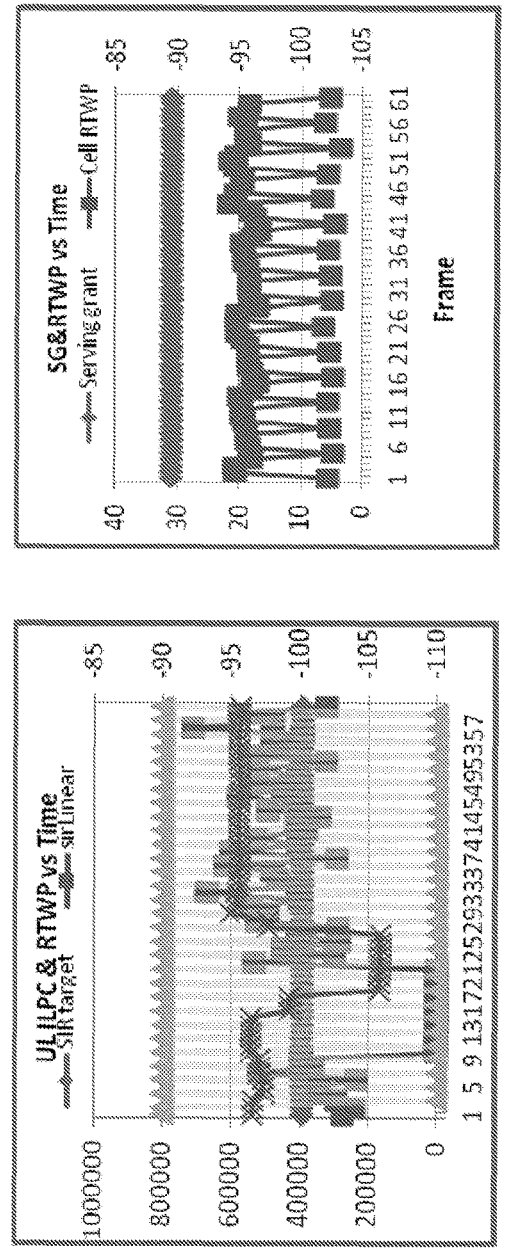
FIG. 10 shows a diagram illustrating an example of a test result of modifying a CM slot mask according to the second embodiment of the invention.

With the second embodiment of the invention, very stable SIR estimation and ULPC can be achieved as illustrated in FIG. 10, left hand diagram. Further, stable RTWP and serving grant scheduled by HSUPA L2 can be achieved as illustrated in FIG. 10, right hand diagram. This results in a throughput of 3.35 Mbps, theoretically 3.6 Mbps.

Some embodiments of the invention can be used in receiver of the BTS (for example in a Rake component of BTS), in the situation that CM is introduced into HSUPA, preferably when HSUPA is in high speed mode with E-DCH set equal to or greater than 2SF2+2SF4.

Figure 11:
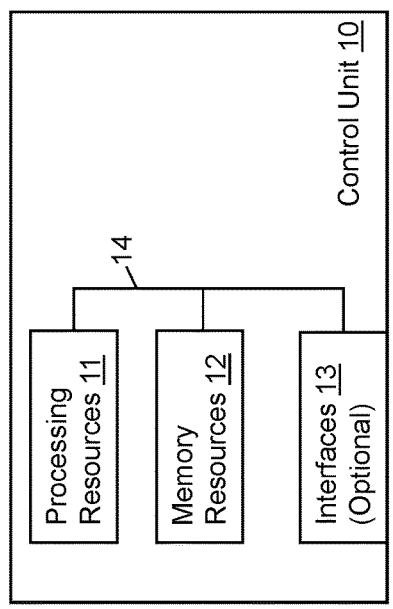
FIG. 11 shows a schematic block diagram illustrating an example of a configuration of a control unit in which examples of embodiments of the invention are implementable.

Now reference is made to FIG. 11 for illustrating a simplified block diagram of an electronic device that is suitable for use in practicing some example embodiments of this invention. According to an example embodiment of the invention, the control unit 10 shown in FIG. 11 is part of and/or used by an access device of a communication network system, such as a BTS, NodeB, etc. According to an example embodiment of the invention, the control unit 10 performs the process 1 illustrated in FIG. 5.

The control unit 10 comprises processing resources 11 and memory resources 12 storing a program, which are coupled by a link 14. Optionally, the control unit 10 further comprises interfaces 13 coupled to the processing resources 11 and memory resources 12 via the link 14. According to an example embodiment, the interfaces 13 comprise a suitable radio frequency (RF) transceiver coupled to one or more antennas (not shown) for bidirectional wireless communications over one or more wireless links with a UE.

The program stored in the memory resources 11 is assumed to include program instructions that, when executed by the associated processing resources 11, enable the electronic device to operate in accordance with the example embodiments of this invention, as detailed above.

In general, the example embodiments of this invention may be implemented by computer software stored in the memory resources 12 and executable by the processing resources 11, or by hardware, or by a combination of software and/or firmware and hardware.

The memory resources 12 may comprise one or more memories or one or more memory devices or memory circuitry which may be of any type suitable to the local technical environment and may be implemented using any suitable data storage technology, such as semiconductor-based memory devices, magnetic memory devices and systems, optical memory devices and systems, fixed memory and removable memory. The processing resources 11 may comprise one or more processors or one or more processing devices or processing circuitry and control circuitry which may be of any type suitable to the local technical environment, and may comprise one or more of general purpose computers, special purpose computers, microprocessors, digital signal processors (DSPs) and processors based on a multi-core processor architecture, as non-limiting examples.

According to an aspect of the invention, an apparatus of a communication network system is provided. According to an implementation example of the invention, the apparatus comprises and/or uses the control unit 10 shown in FIG. 11. According to an implementation example of the invention, the apparatus performs process 1 illustrated in FIG. 5.

The apparatus comprises means for calculating power estimation values for successive time slots of a communication channel based on measurement values for the successive time slots from a user equipment accessing the communication network system via the apparatus, means for performing transmit power control based on the power estimation values, means for detecting if a compressed mode is active for the user equipment, and means for, in case the compressed mode is active, excluding from use for the transmit power control, power estimation values or measurement values for predetermined time slots comprising no time slot or at least one time slot before a first time point T1 at which the user equipment has entered the compressed mode, at least one time slot after a second time point T2 at which the user equipment has returned from the compressed mode, and each time slot between the first time point T1 and the second time point T2.

According to an implementation example of the invention, the predetermined time slots comprise at most two time slots before the first time point.

According to an implementation example of the invention, the apparatus comprises means for detecting if the user equipment is in a high speed mode, wherein the means for excluding perform the excluding of the power estimation values or measurement values in case the compressed mode is active and the user equipment is in the high speed mode.

According to an implementation example of a first embodiment of the invention, the measurement values comprise interference power values and signal power values, and the means for excluding comprise means for detecting if a first ratio between an interference power value of a time slot of the communication channel, which immediately follows the second time point T2, and an interference power value of a penultimate time slot of the communication channel before the first time point T1 is greater than a first threshold m, means for detecting if a second ratio between a signal power value of the time slot immediately following the second point T2 and a signal power value of the penultimate time point before the first time point T1 is greater than a second threshold n, and means for, if the first ratio is greater than the first threshold m and the second ratio is greater than the second threshold n, setting a transmission power control value of 0 for the time slot immediately following the second time point T2 and a transmission power control value of 1 for a second time slot of the communication channel after the second time point T2.

According to an implementation example of the first embodiment of the invention, the means for excluding further comprise means for setting an interference power value for a third time slot of the communication channel after the second time point T2 equal to an interference power value for the third time slot.

According to an implementation example of the first embodiment of the invention, the interference power value of the penultimate time slot of the communication channel before the first time point T1 is a filtered interference power value, and/or the interference power value for the third time slot of the communication channel after the second time point T2 is a filtered interference power value.

According to an implementation example of the first embodiment of the invention, the first and second thresholds m, n are equal to 2.

According to an implementation example of a second embodiment of the invention, the measurement values are not received from the user equipment on the communication channel in the compressed mode during a time period from the first time point T1 to the second time point T2, wherein the first time point T1 corresponds to a time slot TSx of the communication channel and the second time point T2 corresponds to a time slot TSy of the communication channel, and the means for excluding comprise means for using a modified compressed mode mask for masking out measurement values from the user equipment on the communication channel, the modified compressed mode mask having a length equivalent to a third time period from a time gap TGx of an enhanced communication channel, the time gap TGx comprising the time slot TSx of the communication channel, to a time gap TGy of the enhanced communication channel, the time gap TGy comprising the time slot TSy of the communication channel, plus one time slot of the communication channel following the time gap TGy.

According to an implementation example of the invention, the access between the user equipment and the communication network system is a high speed uplink packet access, and/or the communication channel is a dedicated physical control channel, and/or the enhanced communication channel is an enhanced dedicated physical channel.

According to an implementation example of the invention, the means for calculating, performing, detecting, excluding, setting and using are implemented by the processing resources 11 and memory resources 12 and optionally by the interfaces 13 of the control unit 10 of FIG. 11.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by an access device of a communication network system, the method comprising:
    calculating power estimation values for successive time slots of a communication channel based on measurement values for the successive time slots received from a user equipment accessing the communication network system via the access device;
    performing transmit power control based on the power estimation values;
    detecting whether a compressed mode is active for the user equipment; and
    when the compressed mode is active, excluding from the calculating power estimation values or measurement values for predetermined time slots from at least a first time point T1 at which the user equipment has entered the compressed mode, at least one time slot after a second time point T2 at which the user equipment has returned from the compressed mode, and each time slot between the first time point T1 and the second time point T2.

2. The method of claim 1, wherein the predetermined time slots comprise at least one time slot before the first time point.

3. The method of claim 1, further comprising:
    detecting whether the user equipment is in a high speed mode; and
    performing the excluding of the power estimation values or measurement values in case the compressed mode is active and the user equipment is in the high speed mode.

4. The method of claim 1, wherein
    the measurement values comprise interference power values and signal power values, and
    the excluding comprises:
    detecting whether a first ratio between an interference power value of a time slot of the communication channel, which immediately follows the second time point T2, and an interference power value of a penultimate time slot of the communication channel before the first time point T1 is greater than a first threshold m;
    detecting whether a second ratio between a signal power value of the time slot immediately following the second time point T2 and a signal power value of the penultimate time point before the first time point T1 is greater than a second threshold n;
    when the first ratio is greater than the first threshold m and the second ratio is greater than the second threshold n,
    setting a transmission power control value of 0 for the time slot immediately following the second time point T2 and a transmission power control value of 1 for a second time slot of the communication channel after the second time point T2.

5. The method of claim 4, wherein the excluding further comprises:
    setting an interference power value for a third time slot of the communication channel after the second time point T2 equal to an interference power value for the third time slot.

6. The method of claim 4, wherein
    the interference power value of the penultimate time slot of the communication channel before the first time point T1 is a filtered interference power value, and/or
    the interference power value for the third time slot of the communication channel after the second time point T2 is a filtered interference power value.

7. The method of claim 4, wherein the first and second thresholds m, n are equal to 2.

8. The method of claim 1, wherein
    the measurement values are not received from the user equipment on the communication channel in the compressed mode during a time period from the first time point T1 to the second time point T2, wherein the first time point T1 corresponds to a time slot TSx of the communication channel and the second time point T2 corresponds to a time slot TSy of the communication channel, and
    the excluding comprises:
    using a modified compressed mode mask for masking out measurement values from the user equipment on the communication channel, the modified compressed mode mask having a length equivalent to a third time period from a time gap TGx of an enhanced communication channel, the time gap TGx comprising the time slot TSx of the communication channel, to a time gap TGy of the enhanced communication channel, the time gap TGy comprising the time slot TSy of the communication channel, plus one time slot of the communication channel following the time gap TGy.

9. The method of claim 1, wherein
    the access between the user equipment and the communication network system is a high speed uplink packet access, and/or
    the communication channel is a dedicated physical control channel, and/or
    the enhanced communication channel is an enhanced dedicated physical channel.

10. A computer program product comprising a non-transitory computer-readable storage medium bearing computer program code embodied therein for use with a computer, the computer program code comprising code for performing:
    calculating power estimation values for successive time slots of a communication channel based on measurement values for the successive time slots received from a user equipment accessing the communication network system via the access device;
    performing transmit power control based on the power estimation values;
    detecting whether a compressed mode is active for the user equipment; and
    when the compressed mode is active, excluding from the calculating power estimation values or measurement values for predetermined time slots from at least a first time point T1 at which the user equipment has entered the compressed mode, at least one time slot after a second time point T2 at which the user equipment has returned from the compressed mode, and each time slot between the first time point T1 and the second time point T2.

11. An apparatus comprising:
at least one memory including computer program code; and
at least one processor, the at least one memory and the program code being configured, with the at least one processor, to cause the apparatus to perform at least the following:
calculating power estimation values for successive time slots of a communication channel based on measurement values for the successive time slots received from a user equipment accessing the communication network system via the apparatus;
performing transmit power control based on the power estimation values,
detecting whether a compressed mode is active for the user equipment, and
when the compressed mode is active, excluding from the calculating power estimation values or measurement values for predetermined time slots from at least a first time point T1 at which the user equipment has entered the compressed mode, at least one time slot after a second time point T2 at which the user equipment has returned from the compressed mode, and each time slot between the first time point T1 and the second time point T2.

12. The apparatus of claim 11, wherein the predetermined time slots comprise at least one time slot before the first time point.

13. The apparatus of claim 11, wherein the at least one memory and the program code are further configured, with the at least one processor, to cause the apparatus to perform at least the following:
detecting whether the user equipment is in a high speed mode, and
performing the excluding of the power estimation values or measurement values in case the compressed mode is active and the user equipment is in the high speed mode.

14. The apparatus of claim 11, wherein
the measurement values comprise interference power values and signal power values, and
the excluding is performed at least by
detecting whether a first ratio between an interference power value of a time slot of the communication channel, which immediately follows the second time point T2, and an interference power value of a penultimate time slot of the communication channel before the first time point T1 is greater than a first threshold m;
detecting whether a second ratio between a signal power value of the time slot immediately following the second time point T2 and a signal power value of the penultimate time point before the first time point T1 is greater than a second threshold n;
when the first ratio is greater than the first threshold m and the second ratio is greater than the second threshold n, setting a transmission power control value of 0 for the time slot immediately following the second time point T2 and a transmission power control value of 1 for a second time slot of the communication channel after the second time point T2.

15. The apparatus of claim 14, wherein the excluding is performed at least by:
setting an interference power value for a third time slot of the communication channel after the second time point T2 equal to an interference power value for the third time slot.

16. The apparatus of claim 14, wherein
the interference power value of the penultimate time slot of the communication channel before the first time point T1 is a filtered interference power value, and/or
the interference power value for the third time slot of the communication channel after the second time point T2 is a filtered interference power value.

17. The apparatus of claim 14, wherein the first and second thresholds m, n are equal to 2.

18. The apparatus of claim 11, wherein
the measurement values are not received from the user equipment on the communication channel in the compressed mode during a time period from the first time point T1 to the second time point T2, wherein the first time point T1 corresponds to a time slot TSx of the communication channel and the second time point T2 corresponds to a time slot TSy of the communication channel, and
the excluding is performed at least by:
using a modified compressed mode mask for masking out measurement values from the user equipment on the communication channel, the modified compressed mode mask having a length equivalent to a third time period from a time gap TGx of an enhanced communication channel, the time gap TGx comprising the time slot TSx of the communication channel, to a time gap TGy of the enhanced communication channel, the time gap TGy comprising the time slot TSy of the communication channel, plus one time slot of the communication channel following the time gap TGy.

19. The apparatus of claim 11, wherein
the access between the user equipment and the communication network system is a high speed uplink packet access, and/or
the communication channel is a dedicated physical control channel, and/or
the enhanced communication channel is an enhanced dedicated physical channel.

20. The apparatus of claim 11, wherein the apparatus comprises a base station.

* * * * *